Sept. 5, 1961 G. WILKES 2,998,941
POLARIZATION DETECTOR
Filed Aug. 25, 1952 2 Sheets-Sheet 1
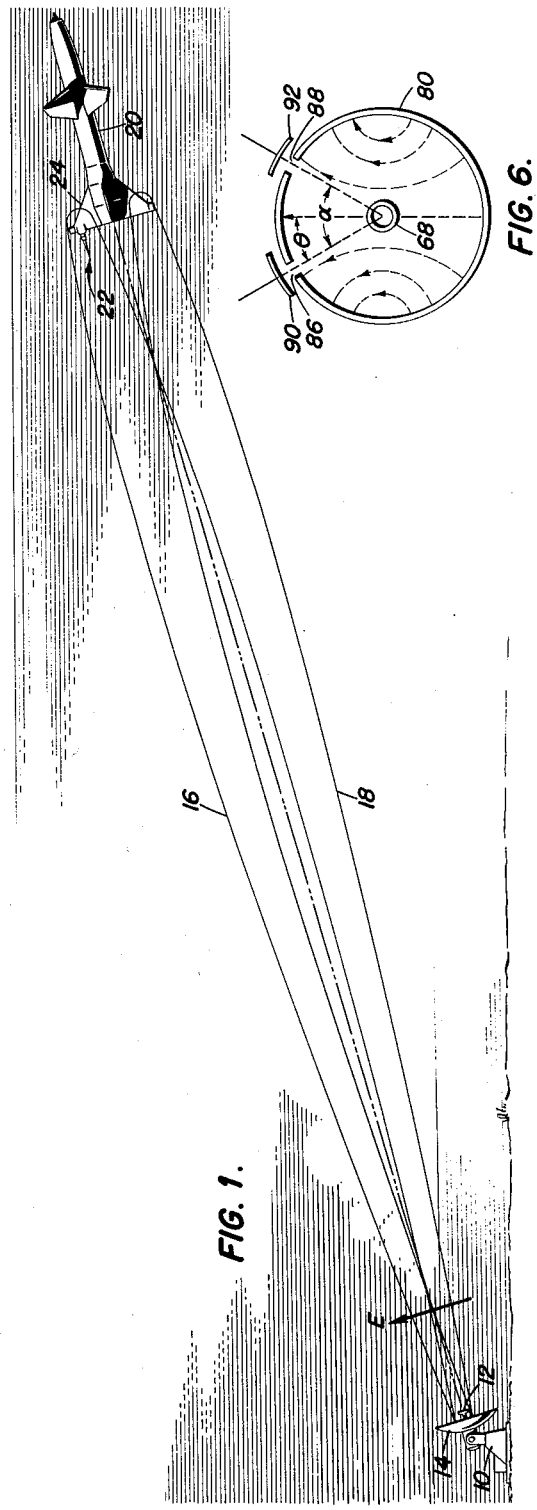
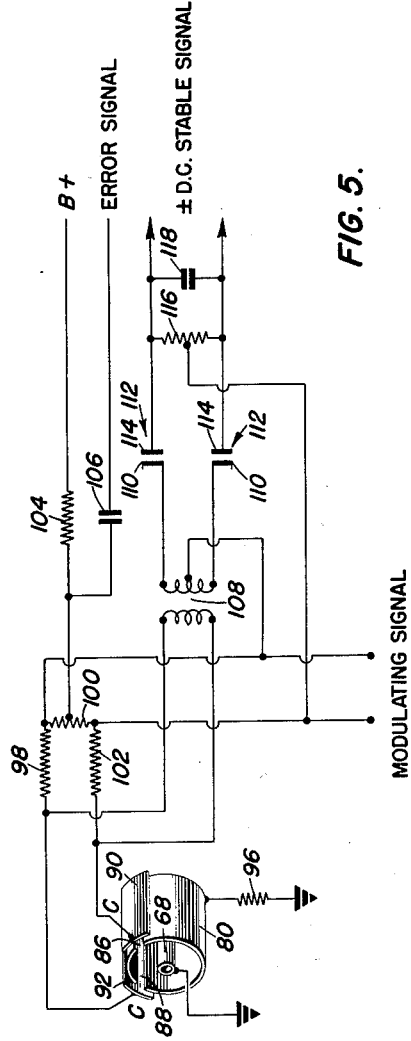
INVENTOR
GILBERT WILKES
BY
ATTORNEYS Sept. 5, 1961  G. WILKES  2,998,941
POLARIZATION DETECTOR
Filed Aug. 25, 1952  2 Sheets-Sheet 2
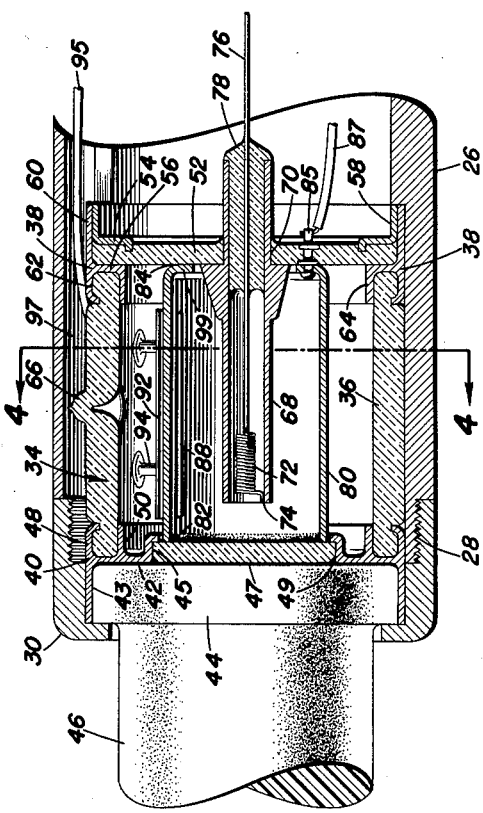
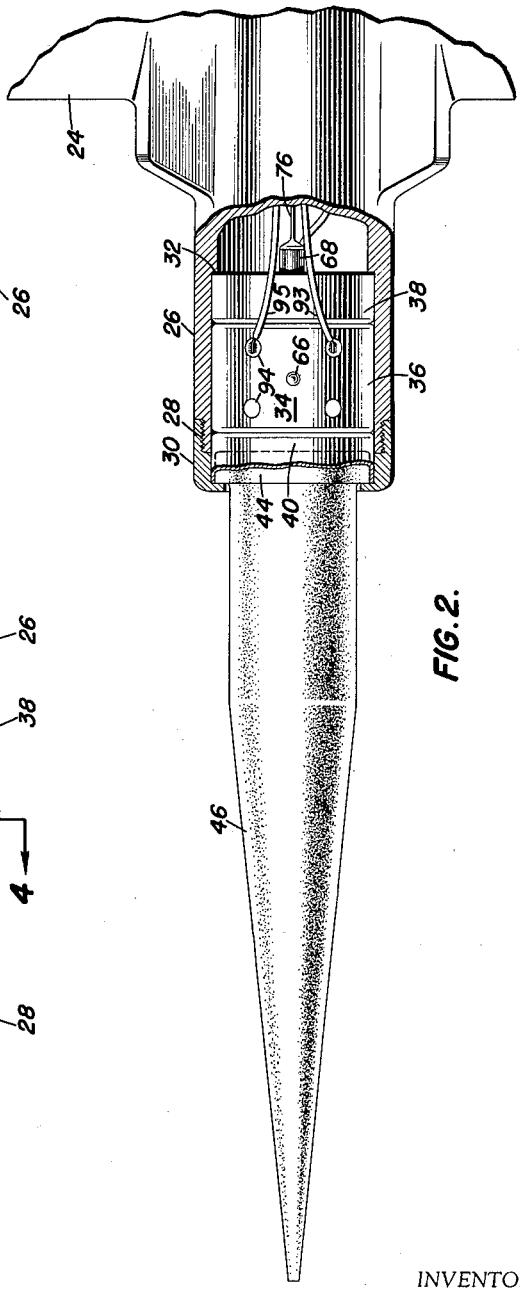
INVENTOR
GILBERT WILKES
BY
ATTORNEYS _United States Patent Office_

2,998,941
Patented Sept. 5, 1961

2,998,941
POLARIZATION DETECTOR
Gilbert Wilkes, Chevy Chase, Md., assignor to the United States of America as represented by the Secretary of the Navy
Filed Aug. 25, 1952, Ser. No. 306,235
7 Claims. (Cl. 244—14)

This invention relates to detecting means for use in combination with guided missile intelligence and control systems to secure stabilization of the missile in flight on the plane of polarization of the guidance beam.

In one form of the systems developed for missile guidance, a missile is guided to intercept the target by being made to ride the axis of a radar beam which is tracking the target. Any deviation from the beam axis results in an error signal which causes the missile intelligence and control systems to bring the missile onto the beam axis. It is necessary to provide a suitable reference for the missile borne computers to enable the latter to provide the required roll control signals which, in turn, drive the missile fins to obtain roll stabilization. In prior art guidance systems, gyroscopes were relied on to establish the reference, and to indicate the rate of diviation from the reference, due to missile roll. A convenient reference for roll stabilization is the plane of polarization of the radar beam employed to track the target. In the present invention the plane of polarization of a radar guidance beam is utilized as a reference for roll stabilization of a missile.

It is an object of this invention to provide a detector which will provide an error signal as well as a signal which may be used to obtain roll stabilization of the missile on the plane of polarization of a radar beam.

An additional object of the invention is to provide a missile lens system which has incorporated therein a polarization and error signal detector.

A further object is to provide a polarization and error signal detector for missile use which is highly sensitive while being rugged in construction and thus suitable for use in combination with guided missiles. It is well known that the performance of the crystal type detectors now employed as detectors in missiles is unsatisfactory because of the extreme temperatures and possible high radar energy power levels experienced during the missile's flight. The detector of the present invention is capable of satisfactory operation under these conditions.

Another object is a polarization and error signal detector which will provide amplification of the received radar signal.

Briefly, the invention comprises a polarization and error signal detection and amplification means in combination with a missile lens antenna structure arranged to receive signals which can be used to bring the missile onto the beam axis and to roll stabilize the missile about the plane of polarization of a tracking radar.

Other objects and many of the attendant advantages of this invention will be readily appreciated as the same becomes better understood by reference to the following detailed description when considered in connection with the accompanying drawings wherein:

FIG. 1 is a diagrammatic illustration showing a missile being guided by a radar beam in accordance with the invention;

FIG. 2 is an elevational view showing the missile lens of the present invention attached to a missile, parts being broken away;

FIG. 3 is an enlarged axial sectional view through the vacuum tube detector incorporated in the lens system of FIG. 2;

FIG. 4 is a sectional view on line 4—4 of FIG. 3;

FIG. 5 is a circuit diagram of the invention; and

FIG. 6 is a diagrammatic illustration of the electric field of a wave passing through the detector.

Referring to the diagrammatic illustration of FIG. 1, there is shown a radar transmitter unit 10 which may be located on ground or aboard ship. The transmitter unit, by means of an antenna 12, a reflector 14, and a nutating mechanism (not shown), propagates a conically scanned beam of electromagnetic energy represented by the lobes 16 and 18. A guided missile 20 is shown within the conically scanned beam. The missile intelligence system receives the propagated beam through the lens system shown generally at 22 as being mounted on one of the missile fins 24. According to the present invention, the missile is roll stabilized in the plane of polarization of the electric field associated with the radar beam which is represented by the vector E in FIG. 1.

The missile lens assembly 22 for receiving the microwave energy of the radar beam is shown in detail in FIG. 2. A generally tubular housing 26 is shown as being made integral with the trailing edge of the missile fin 24. The housing 26 has a threaded reduced portion 28 onto which a retaining cap 30 is screwed. A shoulder 32 is provided on the inner surface of the housing 26. An electron discharge device 34, comprising a cylindrical glass envelope 36 made vacuum tight by a seal 38 at one end and a seal 40 at the other end, is fitted snugly into the housing with seal 38 abutting the shoulder 32. The seal 40 at the other end of the discharge device has a recess which receives an enlarged portion 44 of a lens 46 of dielectric material, such as Teflon (tetrafluoroethylene resin). The lens 46 is tapered and is shown as being circular in cross section. The retaining cap 30 bears against the lens shoulder formed by enlarged portion 44, thus insuring a snug fit between the Teflon lens and the end of the discharge device so that no discontinuity will be presented to a wave passing through the lens into the discharge device. This structural arrangement also serves to retain the vacuum tube 34 snugly in the housing in the manner shown in FIG. 2.

Referring now to FIGS. 3 and 4, the details of the vacuum tube 34, as well as the manner in which the latter is fitted into the housing 26 are shown. The seal 40 at one end of the tube comprises a flat metal disc 42 having an outwardly turned lip 43 which forms a cup shaped recess to receive the enlarged portion 44 of the Teflon lens 46 in the manner described above. A shoulder 45 is formed on the disc 42 to receive a glass iris 47, and a glass to metal seal provided at 49 to maintain a vacuum tight enclosure. The other side of the disc 42 has spaced lips 48 and 50 which receive an edge of the glass envelope so that a vacuum tight metal to glass seal can be effected. The seal 38 at the other end of the tube comprises a glass disc 52 received in the recess formed by spaced flanges 54 and 56 on the metallic rims 58 and 60. The latter rim also has spaced lips 62 and 64 which receive an edge of the glass envelope. Glass to metal seals are effected between lips 62 and 64 and the glass envelope 36, and between flanges 54 and 56 and the glass disc 52. In addition, adjacent portions of the metallic rims 58 and 60 are silver soldered so that the whole assembly may provide a vacuum tight enclosure. A tip 66 is provided for sealing off the envelope after evacuation.

The electrodes of the tube are arranged coaxially within the envelope thus formed. A central aperture is provided in the glass disc 52 to receive the cylindrical cathode 68, a metal to glass seal being effected at 70. The heater for cathode 68 comprises a coil 72 having one lead connected to the cathode 68 as indicated at 74, and its other lead 76 carried out through the opening in the cathode. Fuzed glass shown at 78 is provided to insulate the heater lead 76 from the cathode 68 and to insure the integrity of the vacuum tight enclosure. A cylindrical electrode 80 is held in spaced relationship with respect to the cathode 68 by being joined to the inside face of the iris 47 and to the inside face of glass disc 52 as shown at 82 and 84, respectively. The electrode 80 is insulated from the cathode and the tube housing, and is provided with a terminal 85 having a lead 87 connected thereto. A vacuum tight seal is provided around the terminal 87. A pair of spaced longitudinally extending choke slots 86 and 88 are formed in the cylindrical plate electrode 80. Auxiliary half-wave plates 90 and 92 are placed in back of the slots 86 and 88, respectively, so as to provide the equivalent of a completely symmetrical closed coaxial tube structure. The half-wave plates 90 and 92 are supported by means of a plurality of rivet-like pins 94 passed through the envelope as shown and sealed thereto. Electrical connection to the auxiliary plates may be effected by means of the desired pin and leads 93 and 95 which enter along a groove 97 provided in the tubular housing 26.

For the proper operation of the invention the wave must be transmitted through the coaxial tube structure shown in the forced $TE_{1,1}$ mode. To obtain this mode of transmission, the radius $R_c$ of the cylindrical cathode 68 and the radius $R_s$ of the outer cylindrical electrode 80 must be dimensioned so as to satisfy the following relation:

$$\lambda \leq \frac{2\pi(R_c + R_s)}{2}$$

where $\lambda$ is the wavelength of the transmitted wave. This will be recognized by those experienced in the art as the condition necessary to support forced transmission in a $TE_{1,1}$ polarized mode in a coaxial structure. The width and the position of the auxiliary half-wave plates 90 and 92 are other important considerations. In practice, these plates are made ½λ wide, and are centered at a distance or ¾λ from the inner face of the metallic plate shown at 99.

A schematic diagram of a circuit employing the tube structure so that detection of the guidance beam can be accomplished to provide a signal which can be used to stabilize the missile and bring it onto the beam axis is shown in FIG. 5. The cathode 68 is connected to ground. The electrode 80 may be connected to ground in order to have the same potential as cathode 68 or, optionally, it may be connected to another biasing means such as resistor 96, or to an active bias (not shown) so as to function as a grid or a screen grid. The auxiliary half-wave plates 90 and 92 positioned behind the longitudinal choke slots 86 and 88 are interconnected by a resistor network comprising three resistors 98, 100 and 102. The center tap of resistor 100 is connected through plate load resistor 104 to the positive terminal of a source of direct current so that D.C. potential is applied to the half-wave plates. An alternating voltage of convenient frequency is also applied to the half-wave plates 90 and 92 through connections to a source not shown.

The A.C. error due to the missile's being off the beam axis can be taken through blocking condenser 106. From FIG. 1, it is evident that, with the nutator in position to establish beam 16, the detector in the missile lens 22 will receive a maximum signal, whereas, with the nutator in position to establish beam 18 the detector will receive a minimum signal. This will cause a modulation of signal strength which will be seen by the detector. Thus the detector will provide a signal which is a measure of the error due to the missile's position off the beam center. This error signal will appear after the blocking condenser 106.

To obtain a D.C. signal representing the deviation of the missile from the reference plane of polarization of the guidance beam, a phase detector is employed. The details of the phase detector do not form a part of the present invention and are shown for purposes of illustration only. The opposite ends of the primary winding of transformer 108 are connected to the auxiliary half-wave plates 90 and 92. The end terminals of the secondary winding of transformer 108 are each connected to the cathode 110 and a rectifier 112. The plates 114 of the rectifiers are interconnected through center tapped resistor 116. A smoothing condenser 118 is inserted between the rectifier plates. The modulating voltage from a source not shown is fed into this circuit by the center tap connections on transformer 108 and resistor 116. In this manner the phase of the modulating voltage is compared with the phase of the signal developed in the plate circuit of the tube. The D.C. output will indicate the deviation of the missile from the plane of polarization of the guidance beam.

In the operation of the device as a polarization detector, it will be understood that, because of the dimensions of the wave path through the lens system including the vacuum tube, the dominant transmission mode will be the forced $TE_{1,1}$ mode. The electric field configuration for this mode is transverse to the direction of transmission and is perpendicular to the boundary surface of the conductor. In this case the conductor is the cylindrical electrode 80, and the field configuration will be as indicated by the dashed lines in FIG. 6.

If the vertical axis of the missile carrying the lens system is aligned with the plane of polarization of the guidance beam, the D.C. output from the phase detector circuit will be zero. That is, the potentials appearing across the choke slots 86 and 88 due to the electric field of the transmitted wave will be equal, and there will be no modulation of the signals in the plates 90 and 92. However, when the plane of polarization of the wave passing through the tube is rotated with respect to the choke slots and wave potentials across the slots will be unequal, and the signals in the half-wave plates 90 and 92 will be unequally modulated. In FIG. 6, the angle of separation of the half-wave plates 90 and 92 is represented by $\alpha$, and the angle between the plane of polarization and plate 90 is represented by $\theta$. The modulating potential due to the wave at plate 90 will be a function of the cosine of the angle $\theta$, while the potential at 92 will vary as the cosine of the difference between $\alpha$ and $\theta$. The D.C. signal out of the phase detector of FIG. 5 will be proportional to the angle of rotation of the plane of polarization of the guidance beam, and its polarity will indicate the direction of rotation.

Amplification of the signal will be obtained from the tube structure shown. Referring to FIG. 5, the cathode 68 and the cylindrical electrode 80 may be at approximately the same or different potentials because of the biasing possibilities discussed above. The electrode 80 may be so biased as described above to duplicate the performance of either a grid or a screen grid. Thus, a potential barrier can be provided at the slots 86 and 88, and the steepness of the slope of this barrier may be adjusted as desired by a suitable manipulation of the bias of the half-wave plates and the bias applied to electrode 80. The steepness of the potential barrier is very nearly a direct measure of the amplification factor available in a tube of this type. Only a few electrons will have sufficient velocity to pass through the barrier to the half-wave plates 90 and 92 in the absence of a wave. However, the potential of a wave passing through the tube will cause more or less of the space charge electrons to overcome the barrier at the choke slots in the cylindrical electrode 80 and pass on to the half-wave plates 90 and 92. A small wave potential may cause a large number of electrons to pass to the half-wave plates. Thus, the tube will act as a triode at the proper wave length and amplification of the signal due to the wave passing through the tube will be obtained.

In summary it will be seen that, according to the invention, a coaxial tube structure having spaced choke members in the outer conductor boundary and half-wave plates behind the slots will provide the equivalent of a closed conductor. The spaced slots permit the separate application of potentials to detect the position of the plane of polarization of the wave passing through said coaxial structure as well as providing the usual beam error signal.

It is evident that this system is unambiguous as long as the roll of the missile is contained between 0° and 180°. However, should missile roll exceed these limits, other means such as a rate gyroscope must be introduced to eliminate the ambiguity of the system in a manner well known to those skilled in the art.

Obviously many other modifications and variations of the present invention are possible in the light of the above teachings. It is therefore to be understood that within the scope of the appended claims the invention may be practiced other than as specifically described.

What is claimed is:

1. An electron discharge device for use as a detector of microwave energy, comprising, an evacuated envelope adapted to support transmission of electromagnetic waves axially therethrough, a cathode electrode supported within said envelope, a cylindrical electrode supported in spaced coaxial relationship with said cathode, said cylindrical electrode having spaced longitudinally extending choke slots, means transparent to microwave energy for admitting microwaves generated externally of said cylindrical electrode to the interior thereof, and a plate supported in spaced relationship to each of said slots, each of said plates extending over its respective one of said slots.

2. An electron discharge device for use as a detector of microwave energy, comprising, an evacuated envelope adapted to support transmission of electromagnetic waves axially therethrough, an axially extending cylindrical cathode supported within said envelope, a cylindrical electrode supported in spaced coaxial relationship with said cathode, said cylindrical electrode having spaced longitudinally extending choke slots, means transparent to microwave energy for admitting microwaves generated externally of said cylindrical electrode to the interior thereof, means for applying a bias voltage to said cylindrical electrode, plates positioned over said slots, and means for applying a potential to said plates.

3. A device as set forth in claim 2, wherein said plates are one half wave length in width.

4. In a missile guidance system, means for detecting signals from a radar transmitter, comprising, a housing provided on said missile, a dielectric lens supported by said housing, a vacuum tube detector also supported by said housing, said detector including an evacuated envelope having an iris aligned with said lens, said evacuated envelope being adapted to support transmission axially therethrough in the forced $TE_{1,1}$ mode, an axially extending cathode supported within said envelope, a cylindrical electrode supported in coaxial spaced relationship with said cathode, said electrode having spaced slots, and half-wave plates extending over said slots in spaced relationship thereto.

5. In an electron discharge device for use as a detector of microwaves, a coaxial diode capable of supporting transmission of electromagnetic energy axially therethrough in a forced $TE_{1,1}$ mode, said diode comprising an evacuated envelope, an electron emitting cathode supported axially within said envelope, and an electrode supported in spaced coaxial relationship with said emitting electrode, said electrode having choke slots.

6. An arrangement as set forth in claim 5, wherein said choke slots extend longitudinally of said electrode, and plates one-half wavelength wide are positioned over said slots.

7. An electron discharge device for use as a detector of microwave energy, comprising an evacuated envelope, an axially extending cathode supported centrally of said envelope, an electrode supported in spaced coaxial relationship with said cathode, said electrode being provided with a pair of longitudinally extending spaced choke slots, said cathode and said electrode being arranged to support transmission of electromagnetic waves axially therethrough in a forced $TE_{1,1}$ mode, a plate supported in spaced relationship to each of said slots, each of said plates extending over its respective one of said slots, and means for applying voltages to said cathode electrode and plates to establish a potential gradient therebetween, whereby changes in the orientation of the plane of polarization of waves passing through said envelope with respect to said plates will affect said potential gradient and modulate the flow of electrons in said envelope between said cathode and said plates.

References Cited in the file of this patent

UNITED STATES PATENTS

| 2,156,807 | Farnsworth | May 2, 1939 |
| 2,162,807 | Fritz | June 20, 1939 |
| 2,362,832 | Land | Nov. 14, 1944 |
| 2,422,088 | Ferris | June 10, 1947 |
| 2,460,401 | Southworth | Feb. 1, 1949 |
| 2,579,823 | Homrighous | Dec. 25, 1951 |

FOREIGN PATENTS

| 625,891 | Great Britain | July 6, 1949 |